Figure 1:
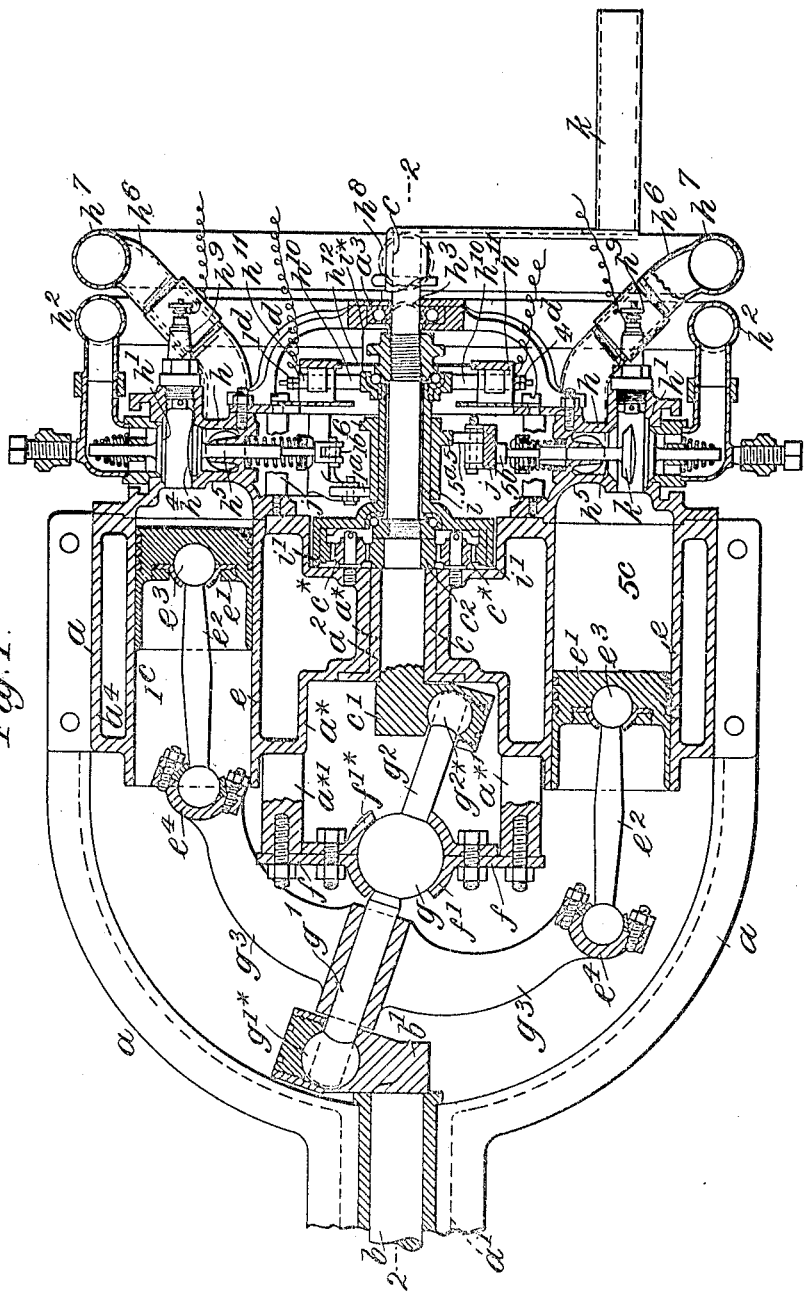

No. 876,202. PATENTED JAN. 7, 1908.
A. J. B. LÉGÉ.
MOTION TRANSMITTING DEVICE FOR MOTIVE POWER ENGINES.
APPLICATION FILED SEPT. 5, 1905.

5 SHEETS—SHEET 1.

Witnesses:
Inventor:—
A. J. B. Légé,
by his Attorneys

No. 876,202. PATENTED JAN. 7, 1908.
A. J. B. LÉGÉ.
MOTION TRANSMITTING DEVICE FOR MOTIVE POWER ENGINES.
APPLICATION FILED SEPT. 5, 1905.
5 SHEETS—SHEET 2.
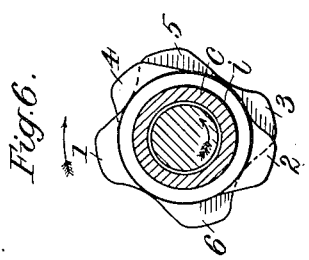
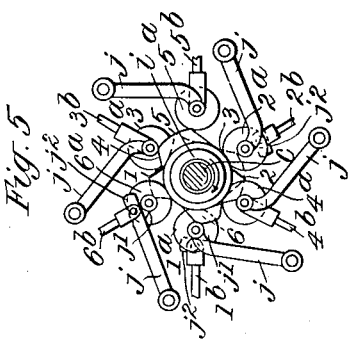
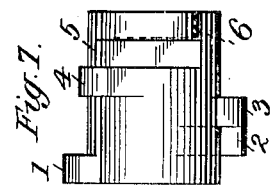
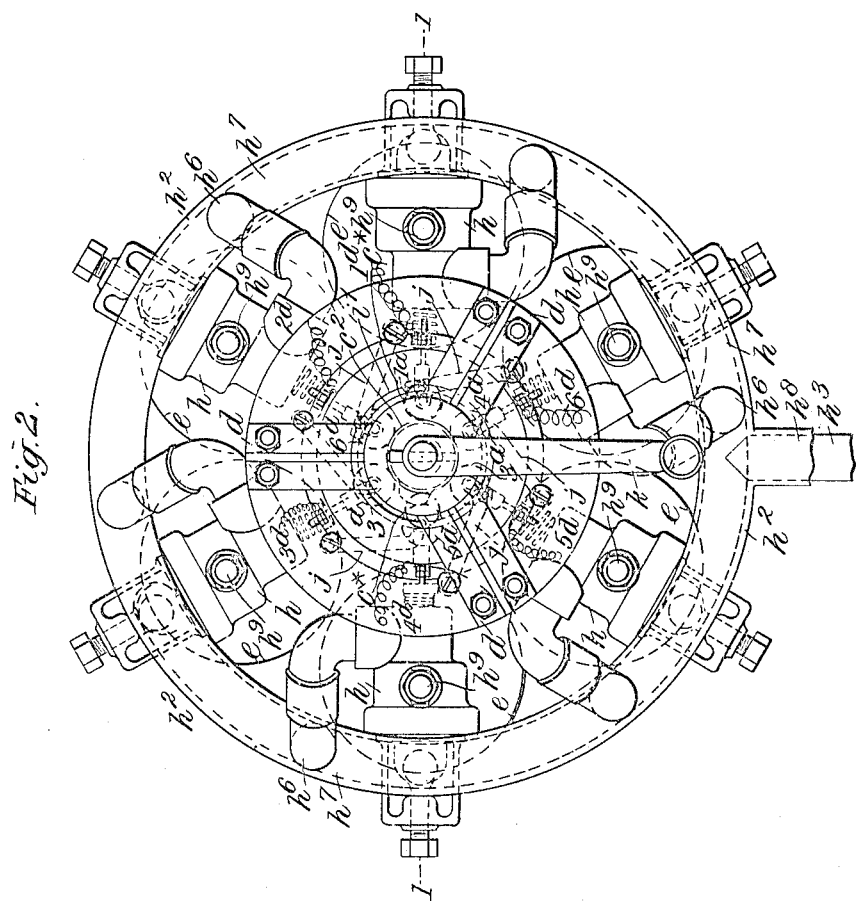
Witnesses:
Inventor:—
A. J. B. Légé,
by his attorneys,

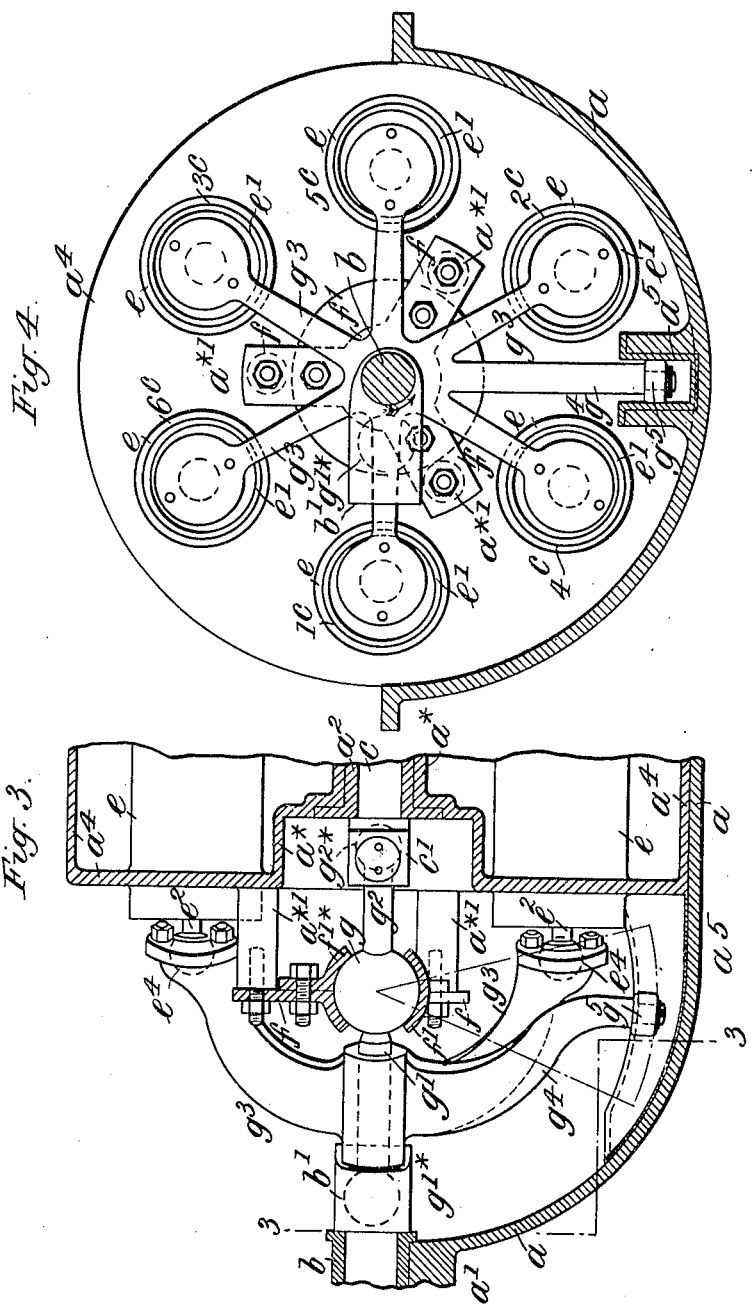

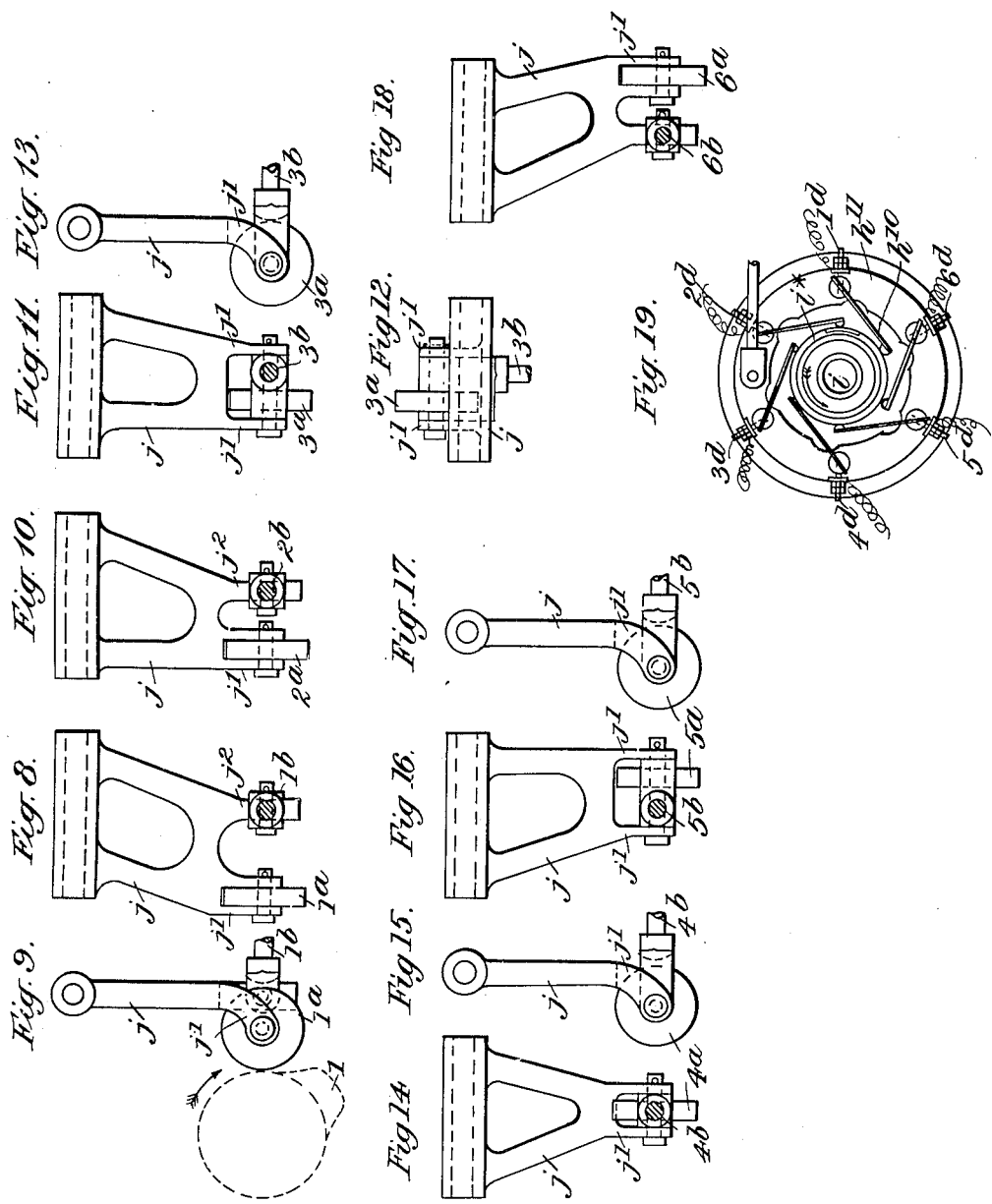

No. 876,202. PATENTED JAN. 7, 1908.
A. J. B. LÉGÉ.
MOTION TRANSMITTING DEVICE FOR MOTIVE POWER ENGINES.
APPLICATION FILED SEPT. 5, 1905.
5 SHEETS—SHEET 5.
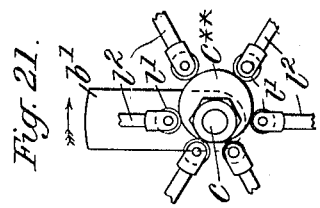
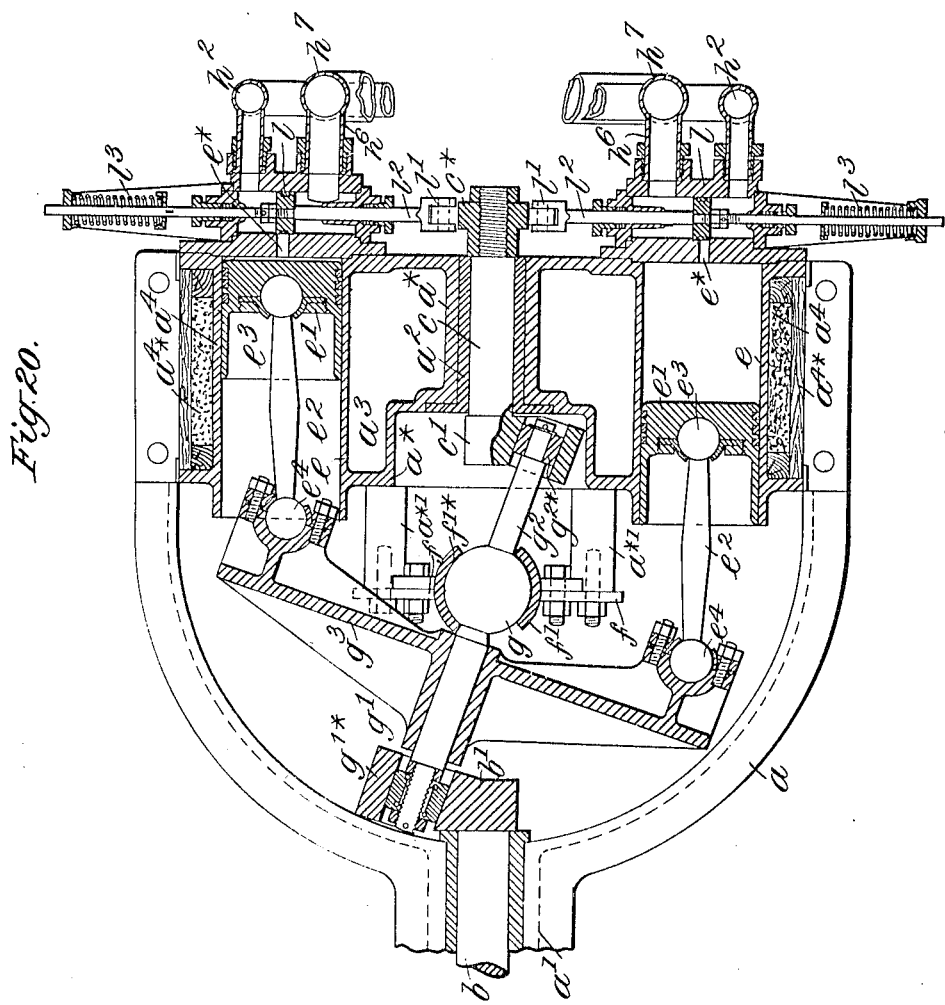

UNITED STATES PATENT OFFICE.

ANNIBAL JEAN BAPTISTE LÉGÉ, OF BARNSBURY, LONDON, ENGLAND.

MOTION-TRANSMITTING DEVICE FOR MOTIVE-POWER ENGINES.

No. 876,202.  Specification of Letters Patent.  Patented Jan. 7, 1908.

Application filed September 5, 1905. Serial No. 277,065.

*To all whom it may concern:*

Be it known that I, ANNIBAL JEAN BAPTISTE LÉGÉ, engineer, a citizen of the Republic of France, residing at Nos. 45 and 47 Lofting road, Liverpool Road, Barnsbury, in the county of London, England, have invented certain new and useful Improvements in and Relating to a Motion-Transmitting Device for Motive-Power Engines, of which the following is a specification.

This invention relates to a motion transmitting device for motive power engines and has reference more particularly to internal combustion engines, although the invention is applicable also to steam engines.

The invention has for its chief object to obviate the drawbacks attending the use of ordinary crank shafts.

According to my said invention, the ordinary crank shaft is dispensed with, and the power of the pistons is transmitted to the machine to be driven by means of an oscillatory lever, frame or disk, mounted at its center of motion upon a universal fulcrum and adapted to receive its oscillatory motion from various pistons with which its several arms or radii are respectively connected by means of universally jointed or socketed links or connecting rods. The said frame or disk transmits a rotary motion to a disk or carrier or equivalent device fast on the driving shaft of the said machine by means of an arm or finger formed or fixed upon the said oscillatory frame or disk at or near its center, and approximately at right angles to the plane thereof. The frame or disk is also provided with an arm or finger for actuating the cam shaft. And in order that the said invention may be more clearly understood and readily carried into effect, I will now proceed, aided by the accompanying drawings, more fully to describe the same.

Figure 1 is a horizontal section taken on the line 1—1 of Fig. 2 of an explosion engine having the present invention applied thereto. Fig. 2 is an end elevation thereof. Fig. 3 is a vertical longitudinal section of parts taken on the line 2—2 of Fig. 1. Fig. 4 is a vertical transverse section taken on the line 3—3 of Fig. 3. Fig. 5 is a sectional elevation of parts showing more particularly the cams and their co-acting trucks and some connections. Fig. 6 is a sectional end elevation of the cams and cam sleeve and secondary shaft. Fig. 7 is a side elevation of the cams and cam boss separately. Fig. 8 is a sectional side elevation of one of the radius arms and part of its connected valve rod separately. Fig. 9 is an end elevation thereof with the corresponding cam shown by dotted lines. Fig. 10 is a similar view to Fig. 8 illustrating another one of the radius arms. Fig. 11 is a similar view to Fig. 8 illustrating another of the radius arms. Fig. 12 is a plan thereof. Fig. 13 is an end elevation thereof. Fig. 14 is a similar view to Fig. 8 illustrating another of the radius arms. Fig. 15 is an end elevation thereof. Fig. 16 is a similar view to Fig. 8 illustrating another of the radius arms. Fig. 17 is an end elevation thereof. Fig. 18 is a similar view to Fig. 8 illustrating another of the radius arms. Fig. 19 is an end elevation of the contact making device separately. Fig. 20 is a similar view to Fig. 1 illustrating the application of the invention to a steam engine, and, Fig. 21 is a detail view of the cam for actuating the valves together with the co-acting ends of the valve rods.

In the several figures, like parts are indicated by similar letters of reference, and Figs. 6 to 19 are drawn to an increased scale with respect to the other figures of the drawings.

Referring to Figs. 1 to 19, $a$ represents the main frame or casing of the engine, $a'$ represents a boss or bearing which is fitted with the usual phosphor bronze or equivalent lining, $b$ represents the main or driving shaft which is mounted in said bearing, and $c$ represents a secondary shaft which is mounted in a bearing $a^2$ carried by the frame $a^*$ and in a second bearing $a^3$ carried by a skeleton or spider like frame $d$ fixed with the valve boxes.

$e$ represents the cylinders of the engine or motor and which may be six in number as shown or any other suitable number are arranged in a circle struck from the common axis of the shafts $b$ and $c$ and said cylinders are preferably surrounded by a water jacket $a^4$ formed by part of the frame or casing $a$ and $e'$ represents the pistons and $e^2$ represents the piston rods which are connected with the pistons by means of ball and socket joints $e^3$, so as to admit of the necessary free movement thereof.

Carried by studs or posts $a^{*\prime}$ projecting from the frame $a^*$ is a spider like skeleton frame $f$ and centrally thereof and integrally therewith is formed a hemispherical part socket or cup $f'$, or the part socket might be formed separately from the frame $f$ and fixed therewith, and removably fixed with the frame $f$ by means of bolts and nuts is the other hemispherical part $f'^*$ of the socket.

Mounted within the cup or socket $f''$ $f'^*$ which constitutes a bearing therefor is a ball or sphere $g$ provided at diametrically opposite points in its circumference with arms or fingers $g'$ $g^2$ which project through openings in the socket or bearing $f''$ $f'^*$ and the end of finger $g'$ is provided with a spherical outer end $g'^*$ which is mounted in a corresponding bearing formed in a crank, offset or carrier $b'$, or it might be a disk or other suitable device fixed with the main shaft $b$ while the arm or finger $g^2$ is similarly provided with a spherical end $g^{2*}$ which is mounted in a corresponding bearing formed in a crank or offset $c'$ fixed with the secondary shaft $c$.

Fixed upon the arm or finger $g'$ is a skeleton frame consisting of a number of radial arms $g^3$ one corresponding with each cylinder $e$ and the outer ends of the piston rods $e^2$ are connected with the extremities of the radial arms $g^3$ by means of ball and socket joints $e^4$ and the piston rods are thus adapted each to impart an independent angular or oscillatory or rocking movement to the frame $g^3$, which is permitted by the peculiar mounting of its axis $g$, and thus give a direct thrust to the crank offset or carrier $b'$, the arm $g^3$ acted upon and the arm or finger $g'$ being in effect a bell crank.

The explosions in the several cylinders are timed or arranged to take place in alternate order so that three cylinders act during each revolution and the arm or finger $g'$ is caused to sweep round in a circular course so that a continuous rotary motion is thus imparted to the main or driving shaft $b$ and through the finger or arm $g^2$ and crank $c'$ to the secondary shaft $c$.

In order to prevent the rotation of the oscillatory frame $g^3$ said frame is provided with an intermediate or supplemental arm $g^4$ which is at its end cranked and provided with a roller $g^5$ which works in a guide $a^5$ carried by the casing $a$.

Each cylinder $e$ and piston $e'$ is in effect an independent engine and inasmuch as the construction and action of an explosion engine is well understood it is not thought necessary to give a detailed description thereof but the main parts of the valve mechanism and some other features will be shortly referred to in order to facilitate their identification.

$h$ represents the valve box of each cylinder within which is the usual automatic or inwardly opening spring valve $h'$ controlling the admission of explosive mixture to the cylinders $e$ and which is supplied to each cylinder by a circular or ring like pipe $h^2$ common to all and which pipe $h^2$ is by a branch $h^3$ adapted to be connected with any well known carbureting apparatus, $h^4$ represents the usual spring closed exhaust valve the rod $h^5$ of which is acted upon at the required times by a cam as hereinafter described to open the valve $h^4$ and the exhaust way of each cylinder is by a branch $h^6$ connected with a circular or ring like pipe $h^7$ common to all and which is provided with an outlet $h^8$.

$h^9$ represents the usual sparking or ignition plug or device of each cylinder which is by a wire electrically connected with a contact blade $h^{10}$ carried by an insulating disk or holder $h''$ which bears against a make and break contact disk or wheel $i^*$ fixed upon a sleeve $i$ revolubly mounted upon the secondary shaft $c$ and which sleeve receives a reduced speed in a ratio of two to one through an internally toothed wheel $i'$ fixed with the sleeve $i$, a toothed wheel $c^2$ fixed with the secondary shaft and intermediate pinions $c^*$ mounted upon studs carried by the casing $a^*$ and which gearing necessarily reverses the direction of rotation of the sleeve $i$ with relation to the shaft $c$.

Fixed with the sleeve $i$ are a number of cams one corresponding with each exhaust valve $h^4$ and marked with numerals 1 to 6, and these cams which are arranged in different planes act upon trucks or rollers numbered $1^a$ to $6^a$ carried by curved offsets $j'$ from radius arms $j$ and the radius arms engage the forked ends $1^b$ to $6^b$ of the rods $h^5$ of the valves $h^4$ as hereinafter more fully described and thus open the exhaust valves $h^4$ of the cylinders marked for the purpose of identification $1^c$ to $6^c$ in the order hereinafter named. The cams and adjacent parts are inclosed and thus protected against dust by a disk or housing $h^{12}$ carried by the holder $h^{11}$.

Each of the radius arms $j$, the trucks of which are numbered $1^a$ and $2^a$ are formed with offsets $j'$ and $j^2$, the one $j'$ being forked to carry the truck, and the other $j^2$ being embraced by and pivotally connected with the forked end $1^b$ $2^b$ of the corresponding valve rod $h^5$ as shown at Figs. 8 to 10.

The radius arm $j$ shown at Fig. 18 and carrying the truck $6^a$ is similar to the above except that the angle thereof is oppositely arranged in order to bring the truck $6^a$ into alinement with its cam 6. The radius arm $j$ shown at Figs. 11 to 13 is substantially the same as those shown at Figs. 8 and 10 except that the offset $j^2$ is dispensed with and the forked end $3^b$ of the valve rod $h^5$ occupies a position within the jaws of the offset $j'$ and the axes of the truck $3^a$ and forked end $3^b$ of the valve rod $h^5$ are coincident one pin serving for both. The radius arm $j$, shown at Figs. 16 and 17, is substantially the same as that lastly hereinbefore described except that the angle thereof is oppositely arranged in order to bring the truck $5^a$ into alinement with its cam 5. The radius arm shown at Figs. 14 and 15 is similar to that lastly hereinbefore described except that the truck $4^a$ and end $4^b$ of the valve rod $h^5$ are centrally arranged and the arm is shaped accordingly.

The cycle of operation of the engine which is according to the well known Otto principle with the arrangement of cams 1 to 6 and trucks $1^a$ to $6^a$ hereinbefore shown and described is as follows:—The charges in cylinders $1^c$ $2^c$ and $3^c$ which have been sucked in and compressed by turning the shafts $c$ through one revolution by the aid of the usual starting handle $k$ are ignited in successive order the current passing by any of the contact terminals $1^d$ $2^d$ and $3^d$ thus bringing about one revolution of the shaft $b$. The exhaust valves $h^4$ of cylinders $5^c$ $6^c$ and $4^c$ are during said revolution each opened in successive order by the cams 5, 6, 4 when the crank or carrier $b'$ arrives in alinement therewith thus scavenging those cylinders and each of said cylinders immediately after the scavenging sucks in its charge of explosive mixture which is subsequently compressed. The charges in cylinders $4^c$ $5^c$ and $6^c$ are then ignited by the contacts $4^d$, $5^d$ and $6^d$ in successive order thus bringing about a second revolution of the shaft $b$. The exhaust valves $h^4$ of cylinders $3^c$, $1^c$ and $2^c$ are during said revolution each opened in successive order by the cams 3, 1 and 2 thus scavenging those cylinders and each of said cylinders immediately after the scavenging sucks in its charge of explosive mixture which is subsequently compressed. The contacts $1^d$, $2^d$, $3^d$ are so arranged that the charges in cylinders $1^c$, $2^c$ and $3^c$ are next ignited in successive order and so on.

Ball bearings are preferably employed at the connections of the arms or fingers $g'$ $g^2$ with their cranks or carriers $b'$, $c'$ and also in connection with the sleeve $i$ of the cams.

In the example given at Figs. 20 and 21, the invention is shown applied to a steam engine. In this case the power transmitting device $g^3$ is constructed as a disk strengthened by webs and the motive fluid is admitted to and exhausted from the cylinders $e$ in successive order by means of piston slide valves $l$ which receive their outward traverse to open the steam ports $e^*$ by an eccentric $c^{**}$ fixed upon the secondary shaft $c$ and driven directly thereby without the intervention of the two speed gear $c^*$, $c^2$, $i'$ employed in the previous arrangements and said eccentric acts upon the trucks or rollers $l'$ of the valve rods $l^2$ so as to effect the outward traverse of the valves $l$ while the inward traverse of said valves to open the exhaust ports $e^*$ is caused by springs $l^3$. The housing $h^{12}$ is in this case dispensed with and instead of the hollow jackets $a^4$ around the cylinders $e$ they are packed with slag wool or other suitable heat non-conducting material inclosed by wood lagging $a^{4*}$. In other respects the engine is substantially the same as that hereinbefore described with respect to the previous figures.

It will be obvious that the construction and arrangement of the parts may be considerably modified without departing from the spirit of the invention and the number of cylinders and co-acting parts employed may be varied as desired, while, in some cases, a second set of cylinders and pistons may be arranged to act upon the opposite side of the power transmitting frame.

By the means hereinbefore described, a crank and crank shaft as ordinarily employed are dispensed with and in the revolution of the main shaft a number of impulses are given thereto so that in effect a rotary engine is obtained possessing the advantages of a reciprocating engine and without the well known drawbacks of a rotary engine.

Having thus described my invention what I claim and desire to secure by Letters Patent is:—

1. In an engine, a frame having a plurality of cylinders arranged in a circle, a main or driven shaft arranged axially of said circle, a power transmitting frame having a universal supporting fulcrum, pistons for the cylinders, piston rods connecting the respective pistons with the power transmitting frame, a cam shaft operated from said power transmitting frame, a plurality of cams arranged side by side on said shaft, an exhaust valve for each cylinder, and mechanism whereby each of the cams on the cam shaft is caused to periodically operate one of the exhaust valves, substantially as described.

2. In an engine, several cylinders arranged in a circle, a main or driven shaft arranged axially of said circle and having an offset, carrier or crank, a secondary or cam shaft in alinement with the main shaft and having a similar offset or crank, a power transmitting frame or disk mounted upon a ball, universal fulcrum or joint arranged axially of said circle and between the ends of the two shafts, piston rods connected by ball or universal joints with their pistons and with the extremities or periphery of the frame or disk, a stud or finger fixed axially with the power transmitting frame or disk and connected with the offset carrier or crank of the main shaft by a universal joint, a secondary finger or stud fixed with the power transmitting frame or disk or its axis and connected by a universal joint with the offset or crank of the secondary shaft, with an exhaust valve for each cylinder, a cam or cams on the cam shaft, and mechanism connecting said cam or cams with the respective exhaust valves, substantially as herein shown and described and for the purpose stated.

3. In an engine, several cylinders arranged in a circle, a main or driven shaft arranged axially of said circle and having an offset carrier or crank, a secondary or cam shaft in alinement with the main shaft and having a similar offset or crank, a power transmitting frame or disk mounted upon a ball or universal joint arranged axially of the circle between the ends of said shafts, suitable valves to the engine, a cam or cams driven directly or indirectly by the secondary shaft for actuating said valves, a lateral offset from the power transmitting device and a co-acting guide for preventing the rotation of said device, substantially as herein shown and described and for the purpose stated.

4. In an engine, a frame having a plurality of cylinders arranged in a circle, a main or driven shaft arranged axially of said circle, a power transmitting frame having a universal supporting fulcrum, pistons for the cylinders, piston rods connecting the respective pistons with the power transmitting frame, a cam shaft operated from said power transmitting frame, a plurality of cams arranged side by side on said shaft, an exhaust valve for each cylinder, a rod for each exhaust valve, a lever having an arm connected to said rod, each lever having a roller placed to be operated on by one of the cams, substantially as described.

ANNIBAL JEAN BAPTISTE LÉGÉ.

Witnesses:
  GEO. S. VAUGHAN,
  WALTER J. SKERTEN.